US010642873B2

(12) United States Patent
Blackford et al.

(10) Patent No.: US 10,642,873 B2
(45) Date of Patent: May 5, 2020

(54) DYNAMIC NATURAL LANGUAGE CONVERSATION

(71) Applicant: Microsoft Technology Licensing, LLC, Redmond, WA (US)

(72) Inventors: Bryan Thomas Blackford, Santa Cruz, CA (US); Gerald S. Edsall, West Vancouver (CA); Joshua A. McCoy, Santa Cruz, CA (US); Stéphane Morichére-Matte, Vancouver (CA); Michael John Rayner, Vancouver (CA); Matthew James Searcy, Vancouver (CA); Noah Glenn Wardrip-Fruin, Santa Cruz, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 390 days.

(21) Appl. No.: 14/491,540

(22) Filed: Sep. 19, 2014

(65) Prior Publication Data
US 2016/0085854 A1 Mar. 24, 2016

(51) Int. Cl.
*G06F 16/33* (2019.01)
(52) U.S. Cl.
CPC ................... *G06F 16/3344* (2019.01)
(58) Field of Classification Search
None
See application file for complete search history.

(56) References Cited

U.S. PATENT DOCUMENTS 8,805,844 B2 * 8/2014 Schorzman ....... G06F 17/30699
707/706
9,716,762 B2 * 7/2017 Petersen ............... H04L 67/142
(Continued)

FOREIGN PATENT DOCUMENTS

WO 2012000043 A1 1/2012

OTHER PUBLICATIONS

Arinbjarnar, Maria, "Rational Dialog in Interactive Games", In Proceedings of the Fall Symposium on Intelligent Narrative Technologies, Nov. 9, 2007, 8 pages.
(Continued)

*Primary Examiner* — Wilson Lee
(74) *Attorney, Agent, or Firm* — Newport IP, LLC; Jacob P. Rohwer

(57) ABSTRACT

Technologies are described herein for providing dynamic natural language interactions between a user and a computing device. In one aspect, a computing device managing a conversation with a user is enhanced with the identification and management of one or more topics. Using techniques described herein, the computing device can focus on one or more topics, shift between topics and/or introduce new topics. Techniques disclosed herein may also manage and process interruptions that may be introduced during a conversation. Dynamic access of contextual information may assist in the generation of contextually-relevant statements, and the contextual information may be used to balance priorities between various topics. Each topic may also have an associated decay rate so that the lifespan of individual topics may track realistic scenarios. In addition, the priorities of individual topics may be dynamically adjusted so topics may track events created by a user and a computing device.

13 Claims, 5 Drawing Sheets

(56) References Cited

U.S. PATENT DOCUMENTS

| | | | | |
|---|---|---|---|---|
| 2003/0135818 | A1* | 7/2003 | Goodwin | G06F 17/30616 715/205 |
| 2003/0208545 | A1* | 11/2003 | Eaton | H04L 29/06 709/206 |
| 2006/0040718 | A1 | 2/2006 | Davis | |
| 2008/0134202 | A1* | 6/2008 | Craggs | G06F 9/542 719/313 |
| 2008/0221871 | A1 | 9/2008 | Braben | |
| 2009/0246419 | A1* | 10/2009 | Lorbek | G09F 17/00 428/31 |
| 2010/0050083 | A1* | 2/2010 | Axen | G11B 27/031 715/726 |
| 2010/0114958 | A1* | 5/2010 | Korenshtein | G06Q 10/10 707/781 |
| 2011/0150198 | A1* | 6/2011 | Walsh | H04M 3/56 379/202.01 |
| 2012/0198355 | A1* | 8/2012 | Lau | G06Q 10/10 715/752 |
| 2013/0282844 | A1* | 10/2013 | Logan | H04L 67/02 709/206 |
| 2013/0283168 | A1* | 10/2013 | Brown | G06F 3/165 715/728 |
| 2014/0244712 | A1* | 8/2014 | Walters | H04L 67/10 709/202 |
| 2014/0250145 | A1* | 9/2014 | Jones | G06Q 10/101 707/769 |
| 2014/0365885 | A1* | 12/2014 | Carson | G06F 3/167 715/708 |
| 2015/0046496 | A1* | 2/2015 | Karmarkar | G09B 7/00 707/798 |
| 2015/0089409 | A1* | 3/2015 | Asseily | G06Q 10/10 715/765 |
| 2015/0149182 | A1* | 5/2015 | Kalns | G10L 15/18 704/275 |
| 2015/0189661 | A1* | 7/2015 | Lindner | H04W 52/0277 455/405 |
| 2015/0278245 | A1* | 10/2015 | Sagar | G06F 17/30174 707/610 |
| 2015/0324466 | A1* | 11/2015 | Dau | H04L 67/28 707/734 |
| 2016/0063122 | A1* | 3/2016 | Asur | G06F 16/345 707/725 |
| 2016/0253049 | A1* | 9/2016 | Wild | B60K 35/00 715/763 |
| 2018/0285312 | A1* | 10/2018 | Liu | G06Q 50/01 |

OTHER PUBLICATIONS

Kacmarcik, Gary, "Using Natural Language to Manage NPC Dialog", In Proceedings of the Artificial Intelligence and Interactive Digital Entertainment, Jun. 2006, 3 pages.

Bertomeu, et al., "Annotation of Joint Projects and Information States in Human-NPC Dialogues", In Proceedings of the First International Conference on Corpus Linguistics, May 7, 2009, 18 pages.

* cited by examiner

DYNAMIC NATURAL LANGUAGE CONVERSATION

BACKGROUND

A growing population of users interact with consumer devices and gaming consoles using voice commands. Although existing consumer devices translate a user's voice to invoke actions, such as a web search or a phone call, existing consumer products are limited in that they are unable to maintain a meaningful conversation with the user. For example, when a user presents a question to a voice-enabled device, typical computers only generate a contrived, short answer.

Existing systems might also be limited by the amount of information they can deliver to an application or remote service. For example, when interacting with a search engine, existing voice-enabled systems are generally limited to communicating a short, translated string to the search engine. Existing voice-enabled systems do not generally provide any substantive interaction beyond this type of exchange. To most users, the typical computer-generated responses of existing voice-enabled systems feel mechanical and unnatural. Such interactions are limited in providing users with a fulfilling experience.

It is with respect to these and other considerations that the disclosure made herein is presented.

SUMMARY

Concepts and technologies are described herein for providing dynamically sequenced natural language interactions between a user and a voice-enabled computing device. In one aspect, a computing device managing a conversation with a user is enhanced with the identification and management of one or more topics. Using techniques described herein, the computing device can focus on one or more topics, shift between topics and/or introduce new topics.

Techniques disclosed herein might also manage and process various types of interruptions that are introduced during the conversation. Techniques disclosed herein dynamically access contextual information from a number of resources to generate contextually-relevant statements and to balance priorities between various topics. Individual topics may be identified and introduced to the conversation in response to a particular user input, event or scenario. Each topic may also have an associated decay rate, so the lifespan of individual topics may emulate realistic scenarios. In addition, the priorities of individual topics may be dynamically adjusted so topics are more aligned with events created by the user and the computing device.

In embodiments disclosed herein, a computing device, such as a personal computer or gaming console, includes a program module that controls a wide range of features of a platform or an application, such as an operating system, office productivity application or gaming application. The program module analyzes scenario data, user history data, speech data and other contextual information to determine a context of a conversation between a user and a computer.

In response to receiving an actionable input, which may include a speech input, a text input and/or an event, the program module may generate a response based on the broader context of the conversation. The response may be in a speech or text form. The response may also be in the form of an action or execution of one or more functions of the program module. As the conversation and events progress, the program module manages priorities of the topics, and the priorities of individual topics may increase or decrease based on events and/or other factors.

The techniques described herein might also be utilized to provide automatic inclusion of contextual awareness, which allows the program module to dynamically introduce topics. According to various embodiments, a topic may be introduced randomly or manually. In addition, a topic may be automatically introduced based on a given situation or action. For instance, the introduction of a topic may be based on an event, scenario or the introduction of specific contextual data, such as the user's progress in a game, the user's profile data, the user's speech input and/or other types of input.

According to various embodiments, the program module provides a number of mechanisms to manage the priority of an individual topic. For instance, the priority of a topic may change over time, and the change may be based on a number of factors such as a decay rate, a user input and/or an event. For instance, the priority of a particular topic may start at a high level, and the priority may be reduced each time a new topic is raised. In another example, the priority of a particular topic may increase as new topics are raised. In yet another example, the priority of a particular topic may decay over time. By dynamically managing the priorities of individual topics, techniques disclosed herein may provide contextually relevant actions and/or contextually relevant content when generating responses to an input, such as a user speech input.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a computer architecture diagram showing an illustrative computer hardware and software architecture for

DETAILED DESCRIPTION

Figure 1:
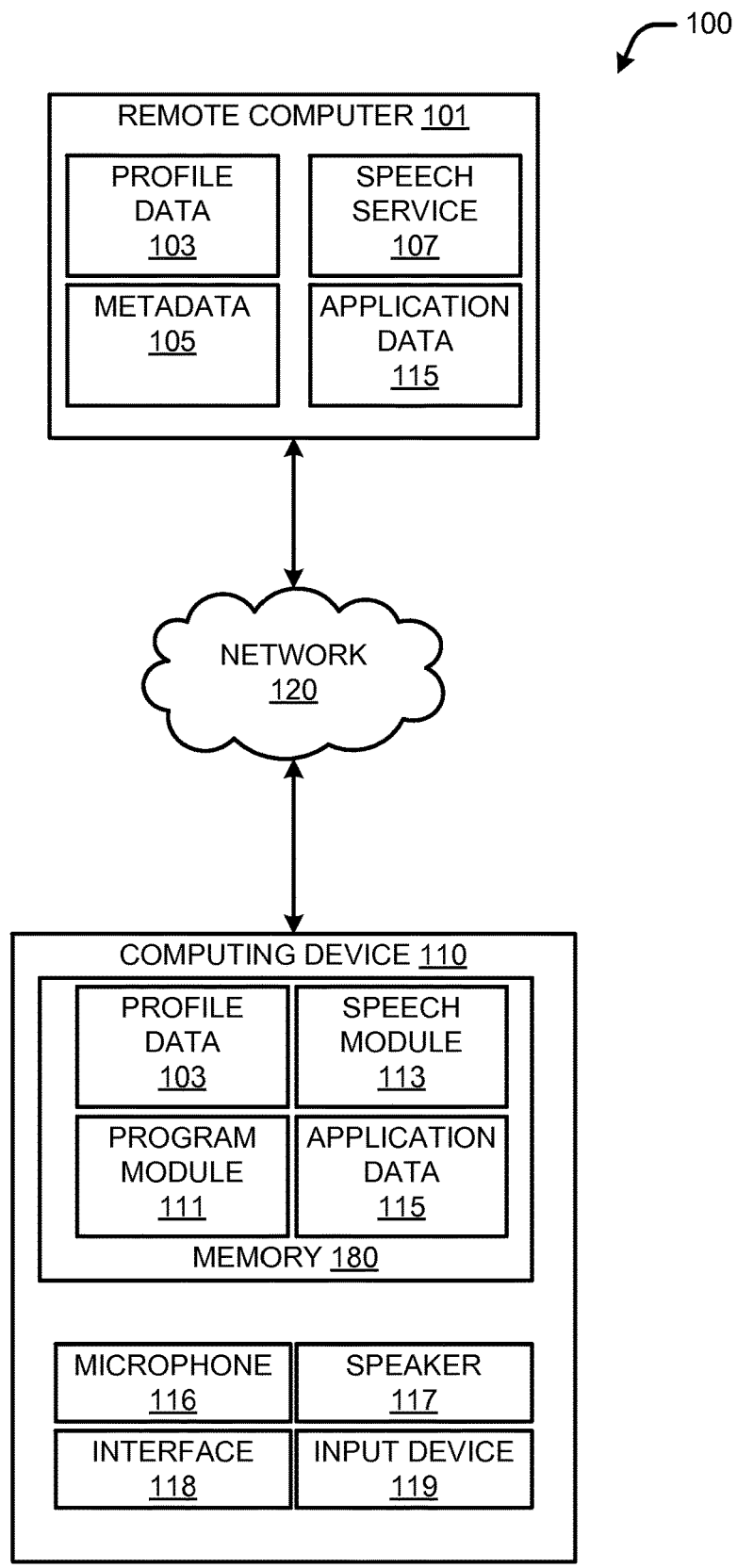
FIG. 1 is a block diagram showing several example components for providing dynamic natural language interactions between a user and a computing device, according to one embodiment disclosed herein.

The technologies described herein provide dynamically sequenced natural language interactions between a user and a computing device. In one aspect, a computing device managing a conversation with a user is enhanced with the identification and management of one or more topics. Using techniques described herein, the computing device can focus on one or more topics, shift between topics and/or introduce new topics.

Techniques disclosed herein might also manage and process various types of interruptions that are introduced during a conversation. Techniques disclosed herein can dynamically access contextual information from a number of resources to generate contextually-relevant statements and to balance priorities between various topics. Individual topics may be identified and introduced to the conversation when a user input, event, or scenario is encountered. Each topic may also have an associated decay rate so the lifespan of individual topics may align with scenarios. In addition, the priorities of individual topics may be dynamically adjusted so topics may track scenarios created by the user and the computing device. The overall experience provided by the techniques described herein can help portray a personality of a character and provide a more natural feel to a conversation that is partially managed by a computing device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for providing dynamic natural language interaction between a user and a computing device will be described.

FIG. 1 is a system diagram showing aspects of one illustrative mechanism disclosed herein for providing dynamically sequenced natural language interaction between a user and a computing device 110. As shown in FIG. 1, a system 100 may include a remote computer 101, a computing device 110 and a network 120. The computing device 110 may operate as a stand-alone device, or the computing device 110 may operate in conjunction with the remote computer 101. As can be appreciated, the remote computer 101 and the computing device 110 are interconnected through one or more local and/or wide area networks, such as the network 120. It should be appreciated that many more network connections may be utilized than illustrated in FIG. 1.

The computing device 110 may include a local memory 180 that stores profile data 103 and application data 115. The computing device 110 may also include a program module 111 configured to manage interactions between a user and the computing device 110. The program module 111 may be in the form of a game application, an office productivity application, an operating system component or any other application with features that interact with the user via speech or text communication.

The computing device 110 might also include a speech module 113 that is configured to operate in conjunction with a microphone 116 and a speaker 117. The speech module 113 may include mechanisms for converting user speech into a computer-readable format, such as a text or binary format. As can be appreciated, the speech module 113 may include a number of known techniques for converting a user's voice to a computer-readable format.

The speech module 113 may also operate in conjunction with a speech service 107 on the remote computer 101 to capture and interpret speech input received at the computing device 110. As can be appreciated, the speech service 107 may utilize resources of a multiple-computer system to translate, transcribe, or otherwise interpret any type of speech input. The computing device 110 may also include an interface 118, which may be in the form of a visual display for communicating text and graphics to the user. The computing device 110 may also include an input device 119, which may be in the form of a keyboard or any other type of hardware for receiving any form of user input to the program module 111.

In one illustrative example, the program module 111 is a game application that creates or allows a user to interact with a virtual world environment. The virtual world environment may include a model for user-controlled and computer-controlled characters that interact with objects. The program module 111 may be configured to operate with the speech module 113 so a user can maintain a conversation with computer-controlled characters in the virtual world environment.

In another illustrative example, the program module 111 may be in the form of an operating system component or an office productivity application. In such embodiments, the program module 111 may be configured to operate with the speech module 113 so the user can communicate with a computer-controlled assistance program providing user support. Such embodiments may include speech communication with at computer-controlled character providing assistance to the user.

In embodiments such as those described above, techniques disclosed herein can be utilized to enhance a user experience by creating a natural, dynamically sequenced dialog between the program module 111 and the user. As described in more detail below, contextual information from the user's input, a profile associated with the user and information describing interactions between the user and the program module 111 may be used to generate contextually relevant responses. As can be appreciated, the examples of the program module 111 described above are provided for illustrative purposes and are not to be construed as limiting.

The remote computer 101 may be in the form of a server computer or a number of server computers configured to store the profile data 103, application data 115 and other information associated with the user and related applications. As can be appreciated, the remote computer 101 may store duplicate copies of the profile data 103 and the application data 115 allowing a centralized service to coordinate a number of client computers, such as the computing device 110.

It can also be appreciated that the profile data 103 may include application usage patterns, achievements, and other information that describes how a user historically interacted with one or more applications and/or program modules. The application data 115 may store data describing current conditions of an application or program module executing on the remote computer 101, the computing device 110 and/or a number of other clients. In one example, as described below, the application data 115 may store data related to one or more topics. The remote computer 101 may also store metadata 105, which may be used to store other contextual information related to the profile data 103 and the application data 115.

With reference to the above-described example involving a virtual world environment, the profile data 103 may store information related to a user's historical usage. For instance, the profile data 103 may store information describing achievements, movement patterns, win/loss records, enemies, peers, inventory packs or any other information related to a user's historical usage or projected future usage of the virtual world environment. The application data 115 may also store current gaming status information. For instance, the application data 115 may store data describing environmental surroundings that a user is experiencing and/or data describing scenarios and interactions the user is experiencing with objects and one or more computer-controlled characters in the environment.

With reference to the above-described example involving the office productivity application, the profile data 103 may store information related to a user's historical usage, such as input patterns, commonly misspelled words, the types of documents typically created, etc. The application data 115 may include the actual documents, templates, etc. As can be appreciated, these examples are provided for illustrative purposes and are not to be construed as limiting.

Figure 2:
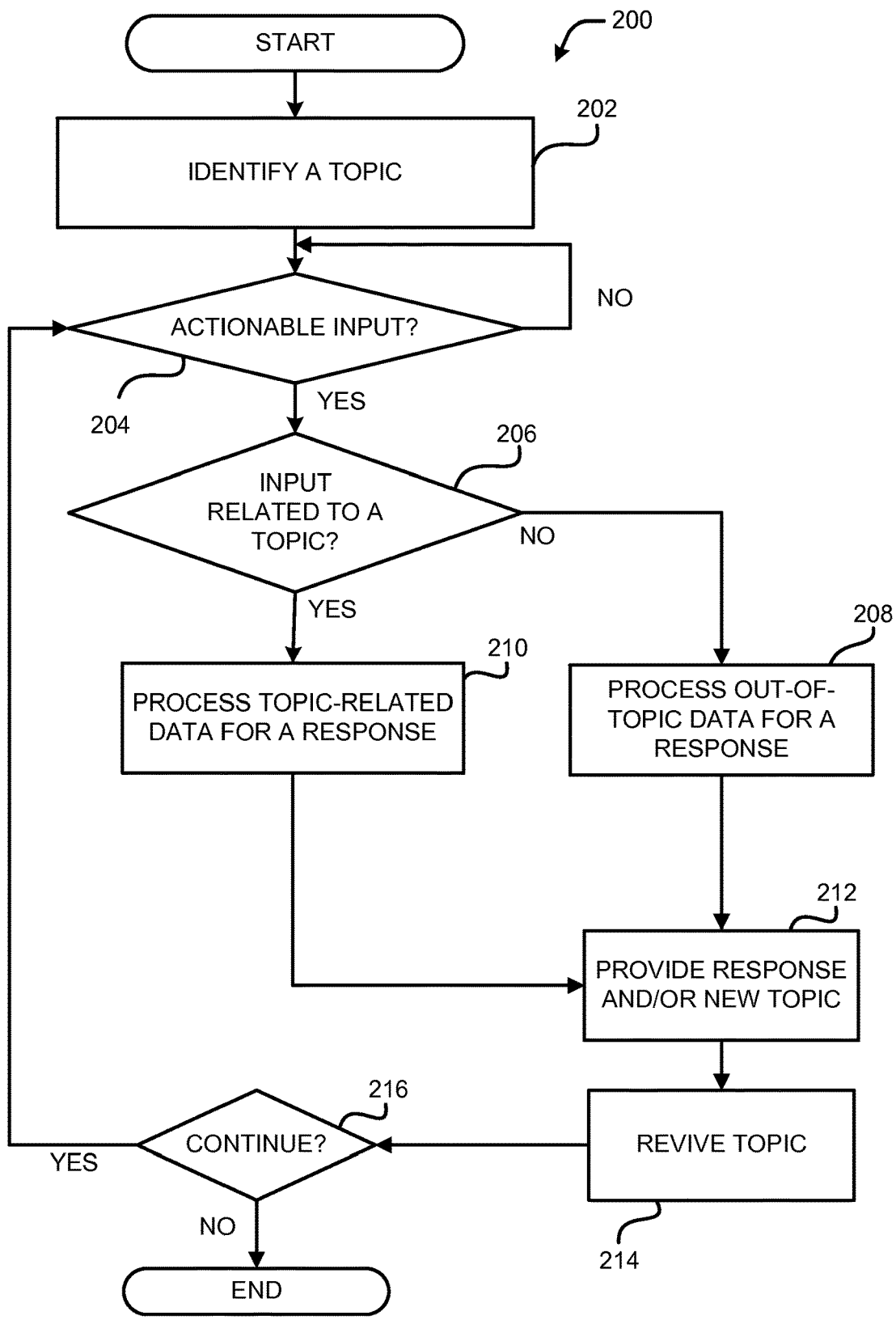
FIG. 2 is a flow diagram illustrating aspects of one illustrative routine for processing and managing topics of a conversation, according to one embodiment disclosed herein.

Turning now to FIG. 2, aspects of a routine 200 for providing dynamic natural language interaction between a user and a computing device 110, according to an illustrative embodiment, are shown and described below. In particular, FIG. 2 illustrates an embodiment where topics of a conversation are introduced and managed. Among other benefits summarized above, techniques described herein may be utilized to keep conversations focused on high-priority topics and allow for the introduction of new topics and interruptions. In addition, the mechanisms disclosed below may be utilized to reintroduce topics when interruptions Occur.

Generally described, a topic is a focal point, subject or contextual reference point that can be used to direct one or more conversations that are, at least in part, controlled by the computing device 110. For illustrative purposes, various embodiments disclosed herein involve data structures that store individual topics. Each topic may be associated with a number of attributes such as a status, a priority and/or a decay rate. In one embodiment, the status of a topic may include an "active" status or an "inactive" status. As will be described in more detail below, techniques disclosed herein may change the status of individual topics as events and conversations progress.

The priority of a topic may include a variable, such as an integer or other like data type, which can be used to rank topics. As will be described below, techniques disclosed herein may change the priority of a topic based on a number of factors, such as an associated decay rate, a user input, an event, a scenario and/or a combination thereof. As also described below, priorities of individual topics allow techniques herein to dynamically transition and process topics during a conversation involving one or more computer-controlled characters.

The decay rate of a topic may control the way in which the priority or the status of a topic changes over time. An individual topic may have a unique decay rate that depends on a number of factors such as a current scenario, historical data, current user data, a user input and/or other contextual information. For instance, in an example where the program module 111 is controlling a virtual world environment, if a topic indicates that a meal is available, e.g., the topic is associated with metadata stating that "a warm dinner is ready," the topic may have a decay rate configured to give the topic a lifespan of few minutes.

Conversely, if a topic indicates that players are in a "combat battle mode," such a topic may not have a decay rate. Instead, the lifespan of such a topic may be based on an event, such as the existence of the combat. In yet another example, a topic related to an achievement in a game may have a decay rate that lowers the priority of the topic over the course of a day. As might be expected in a conversation, it may not be desirable to raise such a topic several days after such an achievement. In some implementations, the decay rate can vary depending on other information such as the skill level of the participating users and the amount of user activity. As can be appreciated, these examples are provided for illustrative purposes and are not to be construed as limiting.

It should also be understood that the operations disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 5, the operations of the routine 200 and other routines are described herein as being implemented, at least in part, by a program module, such as the program module 111 or other application programs shown in FIG. 5. Although the following illustration refers to the program module 111, it can be appreciated that the operations of the routine 200 may also be implemented in many other ways. For example, the routine 200 may be implemented by the use of a combination of program modules operating on both a client and a server. For example, one or more of the operations of the routine 200 may alternatively or additionally be implemented, at least in part, by the remote computer 101 hosting a speech module 107 for converting and processing a speech input.

The routine 200 begins at operation 202, where the program module 111 identifies a topic for a conversation. A topic may be identified by the use of a number of mechanisms. In one embodiment, for example, a topic may be identified by a user input such as a speech input, text input, a movement pattern, etc. In another embodiment, a topic may be automatically identified when the program module 111 encounters a scenario with one or more pre-determined conditions.

In one illustrative implementation, a list of topics can be stored in the computing device 110 and/or the remote computer 101, and each topic can be associated with one or more pre-determined conditions and/or associated metadata. When such a list is utilized, operation 202 may involve techniques for traversing the list of topics to identify one or more relevant topics. During runtime, when the program module 111 encounters a scenario, user input and/or other activity having conditions that match the pre-determined conditions and/or associated metadata of a topic in the list, the topic is identified and marked as active. As can be appreciated, more than one topic in the list may be identified as an active topic.

Figure 3:
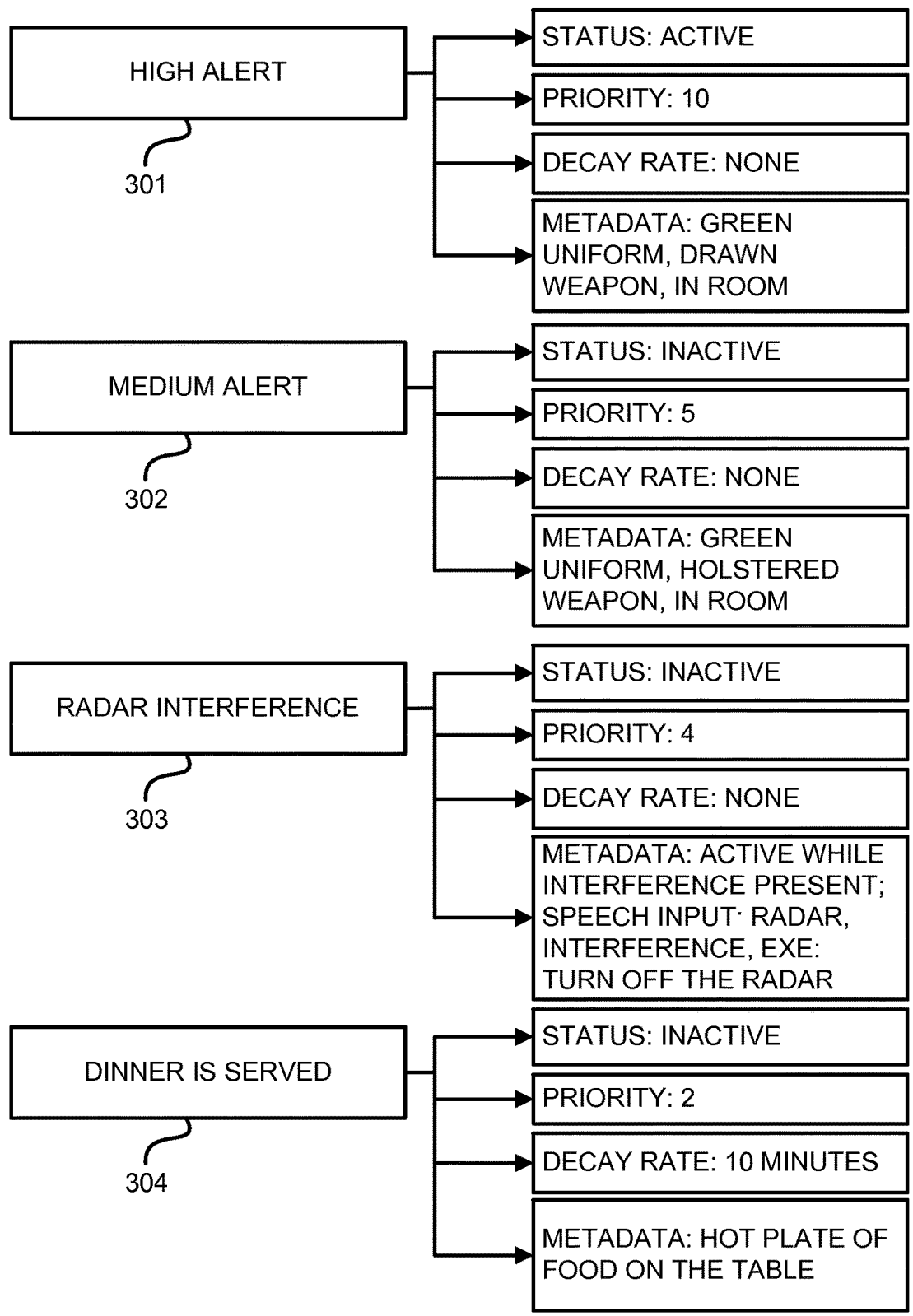
FIG. 3 is a block diagram showing an example data structure that may be utilized in the routine shown in FIG. 2 for processing and managing topics of a conversation, according to one embodiment disclosed herein.

FIG. 3 shows an illustrative example data structure of topics 301-304 that can be used in operation 202. As can be appreciated, the subject matter of the topics may vary greatly to accommodate any type of scenario or theme, such as those presented in a virtual world environment. As shown in FIG. 3, the first two preset topics include a "high alert" topic 301 and a "medium alert" topic 302. The "high alert" topic 301 is associated with metadata, which is also referred to herein as "topic data," describing a first scenario: a character entering a room wearing a green uniform with a drawn weapon. The "medium alert" topic 302 is associated with metadata describing a second scenario: a character entering a room wearing a green uniform with a holstered weapon. During runtime, for example, when the program module 111 encounters a virtual world scenario that matches the first scenario, the "high alert" topic 301 is identified. In such an example, as shown in FIG. 3, the status of the "high alert" topic 301 is then set to "active."

As will be described in more detail below, the active status may remain until one or more actions or events occur. For example, the status of the topic may change to an "inactive" status if the character leaves the room or if a user provides a particular movement, keyboard input and/or a speech input that includes a particular statement or instruction. In this example, for illustrative purposes, the priority of the "high alert" topic 301 is set to a high level. In addition, given the context of this example, the priority of the "high alert" topic 301 is configured to not decay over time.

In another example of operation 202, the program module 111 may be configured to identify a topic if a character in a virtual environment, either a user-controlled character or a computer-controlled character, makes a particular statement or gesture. For instance, if program module 111 were to detect the statement, "we are getting radar interference," the program module 111 may match the statement to keywords in the metadata associated with a topic. In this example, with reference to FIG. 3, such a statement may cause the program module 111 to activate the "radar interference" topic 303. As also shown in FIG. 3, for illustrative purposes, the priority of the "radar interference" topic 303 may be set to a medium level, and the priority may be configured to change as the characters of the game move away from a particular location, e.g., move away from the interference.

As will be described in more detail below, the status or priority of the "radar interference" topic 303 may also change depending on other scenarios or events, such as a user providing a speech input, e.g. a statement "the interference is gone." Such an input may be detected by matching interpreted data of a user input with a pre-determined statement in metadata associated with the topic. As can be appreciated, the user input may be interpreted by a natural language speech module, such as the speech module 113 of the computing device 110 and/or the speech module 107 of the remote computer 101.

In yet another example, such as one involving an office productivity application, a topic may be identified when the program module 111 identifies a scenario or a combination of parameters, such as a keystroke pattern creating a document having the format of a resume. One or more topics stored in the program module 111 may be identified, e.g., topics relating to job-hunting, recruiting, etc. In such an example, the status of related topics may be set to "active" and the priority may be a medium level. As explained in the example below, as the user interacts with a computer-controlled character, a speech output from the program module 111 may provide contextually aware statements given the selected topics.

Although illustrative embodiments of operation 202 include a list of topics or techniques for identifying a topic, it can be appreciated that operation 202 may not identify an active topic. This outcome may be possible if, for example, there are no scenarios or activities related to an active topic. As described in more detail below, active topics may also be identified and generated by other operations of routine 200.

Returning now to FIG. 2, at operation 204 the program module 111 identifies the presence of an actionable input. The actionable input may be in a number of forms. For instance, the actionable input may be a speech input, a text input, a keystroke combination, a changed circumstance based on a computer-controlled or user-controlled command and/or any combination thereof. The actionable input may also be in the form of a scenario created by an interaction between the user and the program module 111. As will be described below, the identification of an actionable input may utilize input data as well as contextual information obtained from multiple resources.

In one illustrative example, the program module 111 may be configured to identify an actionable input based on movement patterns and objects of a user controlling a character in a virtual world map or environment. The program module 111 may also be configured to analyze other data with the movement patterns to identify an actionable input. For instance, if movement patterns indicate the user is lost, e.g., a user-controlled character is wandering in a map, and the profile data 103 also indicates the user is a novice player, such a scenario may be interpreted as an actionable input.

As will be described in more detail below, such an actionable input may trigger the program module 111 to generate a contextually accurate response. For example, when determining that a novice user is lost, the system may ask the user if they need help and/or the system may give specific directions to the user. However, if the same type of movement patterns involve an advanced player, e.g., a player status based on profile data, the system may not interpret such a scenario as an actionable input.

With reference to the above-described example involving a character entering a room wearing a green uniform with a drawn weapon, movements and actions of the character may be considered as an actionable input. For instance, as summarized above, if the character leaves the room, such an action may be considered to be an actionable input. As described in more detail below, a detection of such an actionable input may be used to change the status or priority of one or more topics.

Once an actionable input is identified at operation 204, the routine 200 continues to operation 206 where the program module 111 determines if the actionable input is related to a topic. A number of techniques for determining if the actionable input is related to a particular topic may be utilized. In one embodiment, for instance, the program module 111 may interpret, translate and/or transform the actionable input into contextual information, e.g., data with contextually relevant keywords. The contextually relevant keywords may then be compared with the metadata associated with individual topics. In another embodiment, if the contextually relevant keywords of the actionable input are associated with metadata of a topic, the program module 111 may determine that the actionable input is related to the topic.

Techniques for determining if the actionable input is related to a topic may be applied to all forms of input, including a speech input, a text input, patterns of movement, etc. In the case of a speech input, the speech module 113 may interpret the actionable input to generate a text file having the contextually relevant keywords or a transcription of the speech input. When the user input includes a scenario, keystroke pattern, movement pattern or gesture, those forms of input may be interpreted, translated and/or transformed into contextual information. For instance, with reference to the above-describe example where a user-controlled character is wandering in a virtual world map. Such movements may be considered to be an actionable input. In addition, such movements may be related to contextually relevant keywords, such as, lost, help, etc. Such contextual information may then enable the program module 111 to identify one or more related topics.

Embodiments of operation 206 may include one or more filters when determining if an actionable input relates to a topic. For instance, the actionable input may only be compared with topics having an "active" status. If the contextually relevant keywords interpreted from the actionable input matches the metadata of an active topic, those topics may be determined to be related to the actionable input. In such embodiments, the program module 111 may traverse the topic list to determine if the actionable input is related to an active topic.

As can be appreciated, one or more topics in the topic list may be found to be related to the actionable input. In applying this embodiment to the example topics shown in FIG. 3, when an actionable input is processed in operation 206, only the "high alert" topic 301 would be examined since it is the only topic with an "active" status. However, in other embodiments of operation 206, the program module 111 may implement other filters. For example, the program module 111 may only examine topics having a priority greater than a pre-determined value. Such a filter may allow for further biasing toward certain topics.

In operation 206, when the actionable input involves a speech input, the program module 111 may determine if the actionable input involves a tone or inflection that indicates intent, e.g., a sarcastic, negative or otherwise out-of-topic statement. For instance, the program module 111 may analyze the tone, intonation, accentuation, vocabulary, inflection points or other characteristics about the input to interpret a broader context.

In one illustrative example, the program module 111 may reference a library having a list of designated words and/or intonation patterns that are each associated with a list of response types, e.g., happy, sad, mad, sarcastic, etc. For example, if an input involves vulgar language, the program module 111 may determine that the input is not serious. In such a scenario, the program module 111 may take one or more different actions. For example, the program module 111 may determine that the actionable input does not relate to a topic.

In another example, if the actionable input includes a particular inflection and/or volume, the program module 111 may indicate that a user is being sarcastic. In such an example, the program module 111 may determine that the input is not related to a topic, and the program module 111 may generate additional metadata describing one or more characteristics of the input, e.g., joking, sarcastic, etc. As described below, the additional metadata describing one or more characteristics of the user input may be utilized for generating a contextually relevant response.

In operation 206, if it is determined that the user input is not related to a topic, the routine 200 continues at operation 208 where the program module 111 processes the actionable input to provide a response. Depending on the data that is interpreted from the actionable input, operation 208 may perform a number of functions to generate a response. In one example, the program module 111 may process the metadata describing the characteristics of a user input to generate a speech or text response. In another example, as described in more detail below, the program module 111 may process the metadata describing the characteristics of the user input to determine if a new topic has been raised.

In one embodiment of operation 208, the program module 111 may analyze the active topics to determine if there is a need to bring focus to one or more topics. For instance, if the user input included a statement such as, "I am hungry," while the "high alert" topic 301 is active, the program module 111 may process the user input, along with additional contextual information, and generate a directive to bring focus to the topic. For instance, the program module 111 may generate a speech or text response reminding the user to focus on the "high alert" topic 301. Once the reply is generated, the program module 111 may provide the response to the user in operation 212. As can be appreciated, the delivery of the response may be in the form of a speech output via the speaker 117 or a text output via the interface 118.

In operation 208, the utilization of the contextual information, such as the profile data 103, allows for a more customized and personal response. For example, a response provided to the user may change if a user is a "novice" player versus an "advanced" player. In addition, a response provided to the user may be different if the profile data 103 shows that the user has a history of asking the same question or repeating a statement. In such a scenario, the program module 111 may be able to provide different responses to the user if the user has a history of repeating themselves. This feature can be particularly useful in escalating the tone or volume of a computer-generated response to bring more focus to high-priority topics.

In another embodiment of operation 208, the program module 111 may generate a speech or text response asking the user for verification and/or clarity. In such an embodiment, the program module 111 may collect additional contextual information from the profile data 103, application data 115 and other resources to gain a broader context of the actionable input.

The broader context can be used to enhance a computer-generated response provided in operation 212. For example, using the broader context, the computer-generated response may be configured to add a personal element to the message, e.g., "Mike, I don't understand you when speak with an excited tone. Please repeat yourself" As can be appreciated, responses that are based on the broader context provide benefit when an input is distorted or unreadable.

If an actionable input is characterized as a sarcastic response, the program module 111 may retrieve other contextual data to provide an appropriate response. For example, using the profile data 103 and other data, if the user has a history of being sarcastic, the computer-generated response may say, "Nice try, I've heard that joke before. Please focus on the active, high-priority matters." Thus, personalized responses may be generated by the use of contextually relevant information.

As another example of the type of processing that might occur at operation 208, the program module 111 may process the actionable input with other contextual data to determine if a new topic has been introduced. For instance, in the above example where the user is in a game scenario with the "high alert" topic 301 as an active topic, if the actionable input includes a statement such as "there is a fire," the program module 111 may create a new active topic. The actionable input and the other contextual data may be used to set the parameters of the new topic such as the decay rate, metadata, etc. Such an actionable input may also make the new topic an "active" topic.

Returning to operation 206, if it is determined that the actionable input is related to a topic, the routine 200 proceeds to operation 210 where the program module 111 processes the actionable input to provide a topic-related response. Depending on the data that is interpreted from the user input and the related topics, operation 210 may provide a number of functions. In one example, the program module 111 may process the metadata describing the characteristics of the actionable input and other contextual information to generate a contextually accurate response, such as a speech or text response. In another example, the program module 111 may process the metadata describing the characteristics of the actionable input and other contextual information to determine if actionable input provides an instruction to invoke one more functions of the program module 111.

In one embodiment of operation 210, program module 111 may process the metadata describing the characteristics of the actionable input to generate a speech or text response. For instance, if the radar interference topic 303 is active and the actionable input is a speech input with the statement, "tell me about the interference," the program module 111 would relate the metadata describing the characteristics of the actionable input with the metadata associated with the topic. This relationship would invoke operation 210 to generate a response based on the radar interference topic 303. At operation 212, a speech or text response may then be presented to the user.

Embodiments of operation 210 may also include the processing of additional contextual information. For instance, the application data 115 may include data that describes a scenario or environmental factors that adds context to any statement made in the conversation. In the illustrative example involving the radar interference, the application data 115 may indicate that the user's character is in a combat scenario. With the utilization of such contextual information, the response to the user's statement may be modified. For instance, the response may have a heightened sense of urgency or the level of detail of the response may change.

In another embodiment, the actionable input may be interpreted as an instruction that may invoke one more functions of the program module 111. For instance, if the actionable input includes a statement "turn off the radar," the program module 111 may relate contextual information of the actionable input with the topic metadata. In one specific embodiment, using the topic metadata, e.g., metadata indicating the quote "turn off the radar" relates to an executable instruction, and other contextual information, the program module 111 may interpret the actionable input as an instruction. The program module 111 may then control an element of the environment, such as the activation or deactivation of the radar.

As can be appreciated, although the above description illustrates an executable instruction that is detected and performed in operation 210, an executable instruction may be performed in either operation 210 or 208 of routine 200. For instance, if it is determined at operation 206 that an actionable input is not related to a topic, contextual information describing the actionable input and other contextual data may be used to interpret an out-of-topic input as an executable instruction.

As described above, once the characteristics of the actionable input and additional contextual information is processed in either operation 208 or 210, the routine 200 proceeds to operation 212 where the response is provided. As can be appreciated, the response provided at operation 212 may be in the form of a speech or text output. In addition, the response provided in operation 212 may be in the form of an execution of a function, the activation or deactivation of a program feature, etc.

In operation 212, the program module 111 may be configured to update the profile data 103, application data 115, a status or priority of one or more topics, and other stored data. Such updates may add context from the actionable input, whether it is a speech input, a controller or keyboard input, or any other information that is processed in operations of the routine 200. Such updates enable the program module 111 to track interactions and dynamically balance priorities as scenarios and events progress.

In one embodiment of operation 212, the program module 111 may update stored contextual information by using data that is interpreted from a user's reaction to the response generated in operations 208 or 210. Considering the above-described example involving a user-controlled character wandering in a map, as explained above, such activity may activate a topic related to user help, navigation, etc. When such topics are identified, the program module 111 may provide one or more instructions to the user. For example, the program module 111 may provide navigation directions to the user.

Data describing the user's reaction to the instructions may then be interpreted and stored in the user profile data 103 and/or the application data 115. Once stored, the interpreted data may then be used as contextual data in subsequent interactions between the computer and user. For instance, if an instruction to the user includes specific directions, e.g., a speech output telling the user to "turn right," and the user does not follow the directions, data describing the user's reaction to the direction may be stored. As a result, if the program module 111 encounters the same scenario with the same user, the program module 111 may provide more contextually relevant information, such as different directions. As can be appreciated, this example is provided for illustrative purposes and should not be construed as limiting. In addition, it can be appreciated that operation 212 may not present a response to the user.

In another example involving an update, consider the above-described example involving a character entering a room wearing a green uniform with a drawn weapon. As summarized above, movements and actions of the character may be considered as an actionable input. In addition, such movements may be related to contextual data that relates the movements to one or more topics. In the current example, if the character leaves the room, the status of the topic, e.g., the "high alert" topic 301 may be updated to an "inactive" status and/or the priority of the topic may be reduced.

Next, at operation 214, if needed, the program module 111 may revive one or more active topics. For instance, if the user input included a distorted or off-topic speech input, and at operation 212, the program module 111 responded to the user with an off-topic response, at operation 214, the program module 111 may provide a second response reminding the user to refocus on one or more topics. Such embodiments of operation 214 may be used if the response provided in operation 212 is not related to an active topic.

For instance, referring to the above-described example where the user interrupted the conversation by stating, "there is a fire," at operations 208 and 212, if the program module 111 responded to such an interruption, operation 214 may revive or reintroduce one or more of the active topics. The selection of the one or more revived topics may be based on a number of factors, such as the priority, the last topic discussed, etc. In addition, the selection of the one or more revived topics may be based on other contextual information related to the scenario.

Next, at operation 216, the program module 111 may determine if there is a need to continue processing. In one embodiment, if the program module 111 contains topics having an active status, the routine returns to operation 204 where the program module 111 awaits an additional actionable input. However, if at operation 216, it is determined that there are no additional topics to process, the routine 200 ends. As can be appreciated, this example of operation 216 is provided for illustrative purposes and should not be construed as limiting. There may be a number of factors and parameters that may determine whether the routine 200 continues or terminates.

The techniques described herein allow the program module 111 to perform a wide range of functions with respect to computer-controlled conversations and user interactions. According to various embodiments described above, the management and introduction of a topic may be manual, random or based on a particular scenario. In addition, the introduction of a topic may be based on contextual data, such as the user's progress in a game, the user's profile data, the user's speech input and/or other types of input, such as a text input from a keyboard. The identification of a topic may also be based on a combination of the user's speech input, a scenario and/or other contextual information.

Figure 4:
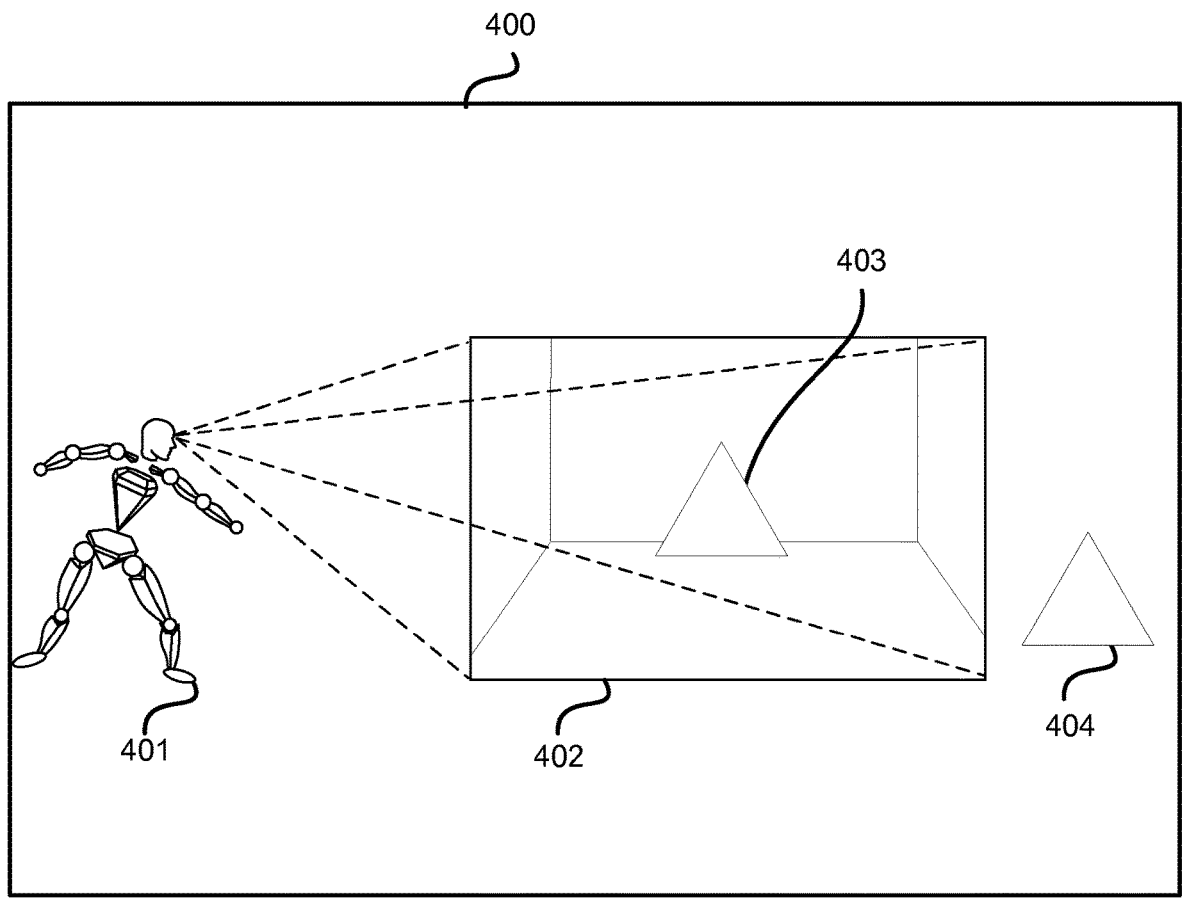
FIG. 4 is block diagram showing objects in the view of a user-controlled character of a virtual environment, according to one illustrative example.

FIG. 4 shows a block diagram of components for a virtual world scenario that may be used in embodiments of routine 200 of FIG. 2. More specifically, the scenario shown in FIG. 4 is one example of how a scenario and a speech input are used in the identification of a topic. In one embodiment, the program module 111 may be configured to automatically select one or more topics relating to an object 403 in a virtual world environment 400 if a user-controlled character 401, such as a virtual avatar, is looking at the object 403 and the user provides a speech input asking a general question. Given that the user-controlled character 401 is looking at the object 403, the program module 111 has context to the question even if the user asks a question as general as, "what is that?"

In one illustrative implementation, the program module 111 may define coordinates of a field of view 402 of the character 401. If coordinates of the object 403 are within the coordinates of the field of view 402, the program module 111 may utilize information describing this scenario with the user's speech input. The combination of the scenario and the user's speech input may automatically activate one or more topics relating to the object 403. Specifically, if the program module 111 contains a topic with metadata describing such a scenario and keywords of predetermined questions, the topic would be selected when the scenario and keywords are presented during runtime. Conversely, a topic regarding an object 404 outside of the field of view 402 may not be selected when such a scenario is presented. Such techniques allowing for dynamic identification of one or more topics based on a combination of factors assists in the generation of more contextually accurate responses.

In another example utilizing embodiments of routine 200 of FIG. 2, consider a virtual word environment involving a user-controlled character in combat scenario. Specific events in the combat scenario, such as poor visibility, for example, cause the program module 111 to identify and activate a topic related to infrared goggles. Activation of this topic may invoke a computer-controlled character to provide an instruction to the user, such as "switch on your IR goggles."

Using the techniques described above, the user may provide a speech input to invoke one or more functions of the program module 111. For instance, in response to hearing the instruction, "switch on your IR goggles," the user may provide a speech input stating, "turn my IR goggles on." The program module 111, using the metadata of any related topics, may invoke one or more functions in response to the receiving the speech input. For example, in response to receiving the user's speech input, the program module 111 may perform the function of turning on a pair of virtual world IR goggles. Thus, using the techniques described above, the program module 111 may perform a function by the use of an associated topic and an interpreted context of the user input.

To perform the above-described function, the program module 111 may use other sources of information to perform more complex functions. For instance, using data such as the profile data 103, the program module 111 may verify the user's inventory before performing the function. If it is determined that the user's inventory does not include IR goggles, for example, the program module 111 may respond with a voice output stating, "you do not have IR goggles." However, it is determined that the user's inventory includes IR goggles, then the program module 111 may respond by turning on a pair of virtual world IR goggles or putting the IR goggles on the user's character. As can be appreciated, the techniques described above have a wide range of applications and uses beyond the above-described examples, which are provided for illustrative purposes and are not to be construed as limiting.

Figure 5:
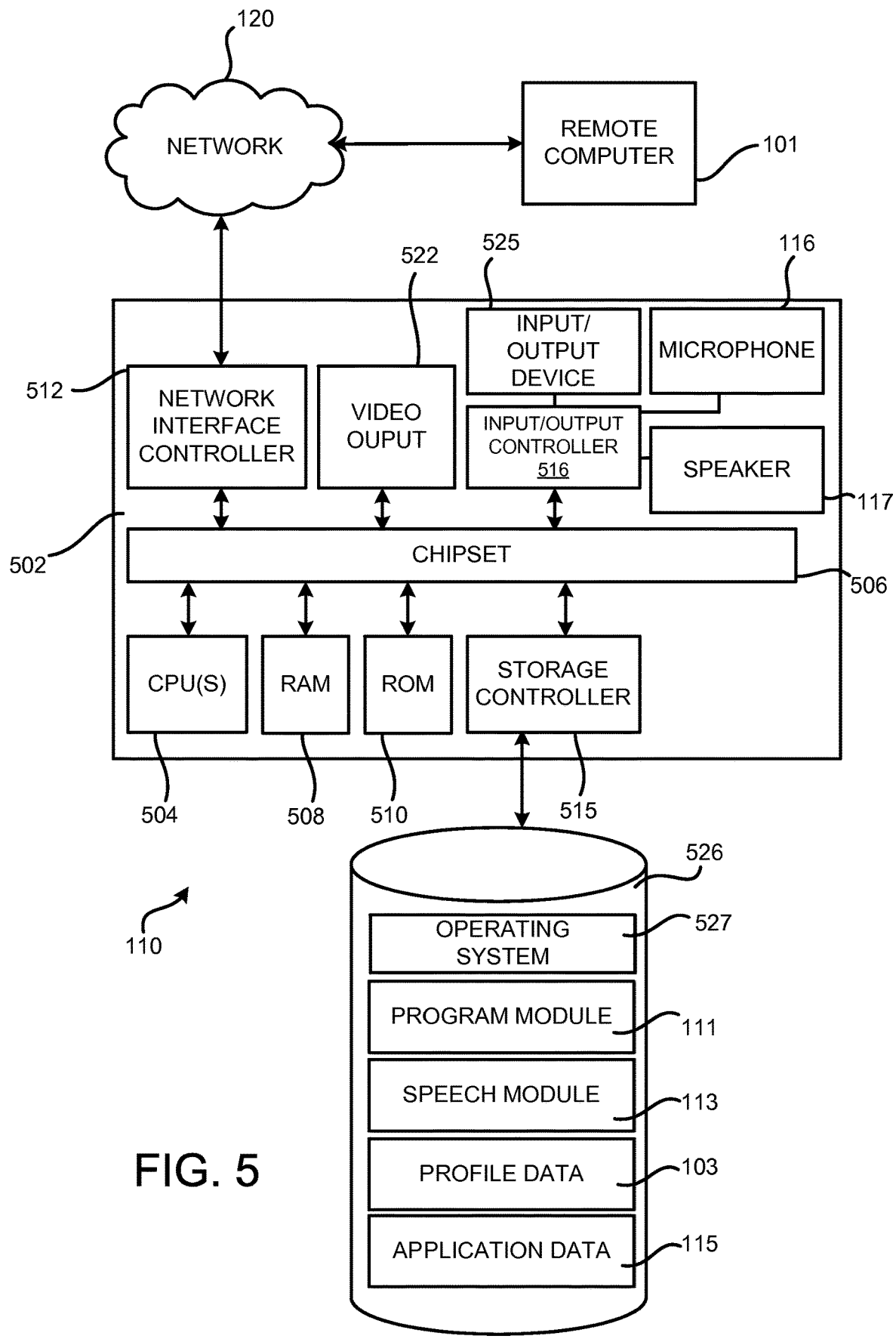

FIG. 5 shows additional details of an example computer architecture for the components shown in FIG. 1 capable of executing the program components described above for providing dynamic natural language interaction between a user and a computing device. The computer architecture shown in FIG. 5 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 5 may be utilized to execute any of the software components described above. Although some of the components described herein are specific to the computing device 110, it can be appreciated that such components, and other components may be part of the remote computer 101.

The computing device 110 includes a baseboard 502, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 504 may be standard programmable processors that perform arithmetic and logical operations necessary for the operation of the computing device 110.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the computing device 110. The chipset 506 may further provide an interface to a computer-readable storage medium such as a read-only memory ("ROM") 510 or non-volatile RAM ("NVRAM") for storing basic routines that help to startup the computing device 110 and to transfer information between the various components and devices. The ROM 510 or NVRAM may also store other software components necessary for the operation of the computing device 110 in accordance with the embodiments described herein.

The computing device 110 may operate in a networked environment using logical connections to remote computing devices and computer systems through a network, such as the local area network 120. The chipset 506 may include functionality for providing network connectivity through a network interface controller (NIC) 512, such as a gigabit Ethernet adapter. The NIC 512 is capable of connecting the computing device 110 to other computing devices over the network 120. It should be appreciated that multiple NICs 512 may be present in the computing device 110, connecting the computer to other types of networks and remote computer systems. The network 120 allows the computing device 110 to communicate with remote services and servers, such as the remote computer 101. As can be appreciated, the remote computer 101 may host a number of services such as the XBOX LIVE gaming service provided by MICROSOFT CORPORATION of Redmond Wash. In addition, as described above, the remote computer 101 may mirror and reflect data stored on the computing device 110 and host services such as the speech service 107.

The computing device 110 may be connected to a mass storage device 526 that provides non-volatile storage for the computing device. The mass storage device 526 may store system programs, application programs, other program modules, and data, which have been described in greater detail herein. The mass storage device 526 may be connected to the computing device 110 through a storage controller 515 connected to the chipset 506. The mass storage device 526 may consist of one or more physical storage units. The storage controller 515 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 526, other storage media and the storage controller 515 may include MultiMediaCard (MMC) components, eMMC components, Secure Digital (SD) components, PCI Express components, or the like.

The computing device 110 may store data on the mass storage device 526 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 526 is characterized as primary or secondary storage, and the like.

For example, the computing device 110 may store information to the mass storage device 526 by issuing instructions through the storage controller 515 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 110 may further read information from the mass storage device 526 by detecting the physical states or characteristics of one or more particular locations within the physical storage units.

In addition to the mass storage device 526 described above, the computing device 110 may have access to other computer-readable media to store and retrieve information, such as program modules, data structures, or other data. Thus, although the program module 111, speech module 113, profile data 103, application data 115 and other modules are depicted as data and software stored in the mass storage device 526, it should be appreciated that these components and/or other modules may be stored, at least in part, in other computer-readable storage media of the computing device 110. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 110.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 110. For purposes of the claims, the phrase "computer storage medium," and variations thereof, does not include waves or signals per se and/or communication media.

The mass storage device 526 may store an operating system 527 utilized to control the operation of the computing device 110. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 526 may store other system or application programs and data utilized by the computing device 110, such as the program module 111, speech module 113, profile data 103, application data 115 and/or any of the other software components and data described above. The mass storage device 526 might also store other programs and data not specifically identified herein.

In one embodiment, the mass storage device 526 or other computer-readable storage media is encoded with computer-executable instructions which, when loaded into the computing device 110, transform the computer from a general-purpose computing system into a special-purpose computer capable of implementing the embodiments described herein. These computer-executable instructions transform the computing device 110 by specifying how the CPUs 504 transition between states, as described above. According to one embodiment, the computing device 110 has access to computer-readable storage media storing computer-executable instructions which, when executed by the computing device 110, perform the various routines described above with regard to FIG. 2 and the other figures. The computing device 110 might also include computer-readable storage media for performing any of the other computer-implemented operations described herein.

The computing device 110 may also include one or more input/output controllers 516 for receiving and processing input from a number of input devices, such as a keyboard, a mouse, a microphone, a headset, a touchpad, a touch screen, an electronic stylus, or any other type of input device. Also shown, the input/output controllers 516 is in communication with an input/output device 525. The input/output controller 516 may provide output to a display, such as a computer monitor, a flat-panel display, a digital projector, a printer, a plotter, or other type of output device. The input/output controller 516 may provide input communication with other devices such as a microphone 116, a speaker 117, game controllers and/or audio devices. In addition, or alternatively, a video output 522 may be in communication with the chipset 506 and operate independent of the input/output controllers 516. It will be appreciated that the computing device 110 may not include all of the components shown in FIG. 5, may include other components that are not explicitly shown in FIG. 5, or may utilize an architecture completely different than that shown in FIG. 5.

Based on the foregoing, it should be appreciated that technologies for dynamic natural language conversation are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method, comprising:
   identifying, at a computing device and at a first time, a first topic of a conversation;
   identifying, at the computing device and at a second time, a second topic of the conversation;
   determining a first decay rate for the first topic to emulate a first realistic scenario associated with the first topic;
   determining a second decay rate for the second topic to emulate a second realistic scenario associated with the second topic, wherein the first decay rate is different than the second decay rate;
   receiving, at the computing device at a third time, a natural language user input at the computing device;
   obtaining a first priority of the first topic based on the first time when the first topic is identified, the third time when the natural language user input is received, and the first decay rate;
   obtaining a second priority of the second topic based on the second time when the second topic is identified, the third time when the natural language user input is received, and the second decay rate;
   determining, at the computing device, that the natural language user input is associated with one of the first topic or the second topic based on a determination that one of the first priority or the second priority is a higher priority; and
   generating a response to the natural language user input, at the computing device, wherein the response is associated with the one of the first topic or the second topic.

2. The method of claim 1, wherein generating the response to the natural language user input comprises generating updated profile data.

3. The method of claim 1, further comprising:
generating a virtual environment having an object and a virtual avatar;
determining if a field of view of the virtual avatar includes the object; and
associating the object with the one of the first topic or the second topic if it is determined that the field of view of the virtual avatar includes the object.

4. The method of claim 1, further comprising interpreting an intonation of the natural language user input to generate contextual data, and wherein generating the response to the natural language user input is based on the contextual data.

5. The method of claim 1, further comprising receiving metadata identifying a status of the first topic or the second topic that is based on a context of a statement of the conversation, wherein the response is based on the status of the first topic or the second topic.

6. The method of claim 1, wherein the first decay rate is less than the second decay rate, wherein the first decay rate lowers the first priority at a rate that is slower than a rate in which the second decay rate lowers the second priority.

7. The method of claim 1, wherein the first decay rate is based on a skill level of a user participating in the conversation.

8. The method of claim 1, wherein the first decay rate determines a reduction of the first priority over a time period, and wherein the second decay rate determines a reduction of the second priority over the time period.

9. A computing device, comprising:
a processor; and
a computer-readable storage medium in communication with the processor, the computer readable storage medium having computer-executable instructions stored thereupon which, when executed by the processor, cause the processor to:
identify, at a first time, a first topic of a conversation;
identify, at a second time, a second topic of the conversation;
determine a first decay rate for the first topic to emulate a first realistic scenario associated with the first topic;
determine a second decay rate for the second topic to emulate a second realistic scenario associated with the second topic, wherein the first decay rate is different than the second decay rate;
receive, at a third time, a natural language user input;
obtain a first priority of the first topic based on the first time when the first topic is identified, the third time when the natural language user input is received, and the first decay rate;
obtain a second priority of the second topic based on the second time when the second topic is identified, the third time when the natural language user input is received, and the second decay rate;
determine that the natural language user input is associated with one of the first topic or the second topic based on a determination that one of the first priority or the second priority is a higher priority; and
generate a response to the natural language user input wherein the response is associated with the one of the first topic or the second topic.

10. The computing device of claim 9, wherein the first decay rate is less than the second decay rate, wherein the first decay rate lowers the first priority at a rate that is slower than a rate in which the second decay rate lowers the second priority.

11. The computing device of claim 9, wherein the first decay rate is based on a skill level of a user participating in the conversation.

12. The computing device of claim 9, wherein the first decay rate determines a reduction of the first priority over a time period, and wherein the second decay rate determines a reduction of the second priority over the time period.

13. The computing device of claim 9, wherein the first decay rate or the second decay rate is based on a mode associated with an application.

* * * * *